United States Patent
Otte et al.

(10) Patent No.: US 6,321,216 B1
(45) Date of Patent: Nov. 20, 2001

(54) METHOD FOR ANALYSIS AND DISPLAY OF TRANSIENT PROCESS EVENTS USING KOHONEN MAP

(75) Inventors: Ralf Otte; Gerd Rappenecker, both of Weinheim; Karl Goser, Hagen, all of (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 08/982,613

(22) Filed: Dec. 2, 1997

(30) Foreign Application Priority Data

Dec. 2, 1996 (DE) .............................................. 196 49 633

(51) Int. Cl.⁷ ....................................................... G06F 15/18

(52) U.S. Cl. ................................ 706/21; 706/14; 706/16; 706/20; 706/906; 706/907

(58) Field of Search ............................... 706/14, 21, 907, 706/906, 20, 16

(56) References Cited

U.S. PATENT DOCUMENTS

| 5,222,210 | * | 6/1993 | Leivian | 706/11 |
| 5,444,819 | * | 8/1995 | Negishi | 706/21 |
| 5,448,681 |   | 9/1995 | Khan | 706/23 |
| 5,602,886 | * | 2/1997 | Gross et al. | 376/253 |
| 5,625,751 | * | 4/1997 | Brandwajn et al. | 706/20 |
| 5,761,386 | * | 6/1998 | Lawrence et al. | 706/21 |
| 5,809,490 | * | 9/1999 | Guiver et al. | 706/16 |
| 5,859,773 | * | 1/1999 | Keeler et al. | 706/906 |

FOREIGN PATENT DOCUMENTS

| 2012702 A | * | 10/1990 | (CA) . |
| 0829809 | * | 9/1997 | (EP) . |

OTHER PUBLICATIONS

Jannie S.J., "The Tracking of Changes in Chemical Processes Using Computer Vision and Self–Organizing Maps", IEEE ICNN, Dec. 1995.*
Macq et al, "Analog Implementation of a Kohonen Map With On–Chip Learning", IEEE Transactions on Neural Networks, vol. 4, No. 3, May 1993.*
Tanaka et al, "Application of Kohonen's Self–Organizing Network to the Diagnosis System for Rotating Machinery", IEEE Inter. Conf. on Systems and Cybernetics, Oct. 1995.*
Bartal et al, "Nuclear Power Plants Transient Diagnostics Using LVQ", IEEE ICNN, Jun.–Jul. 1994.
Basu et al, "Back Propagation Architecture Optimization and an Application in Nuclear Power Plant Diagnostics", Proceedings of the American Power Conference, Apr. 1993.*
Whittington et al, "The Application of a Neural Network Model to Sensor Data Fusion", Proceedings of the SPIE—The International Society for Optical Engineering, Apr. 1990.*
Kohonen, T., "Self–Organized Formation of Topologically Correct Feature Maps", Biological Sybernetics, 1982.*
International Application WO 97/14113 (Weineck et al.), dated Apr. 17, 1997.

(List continued on next page.)

*Primary Examiner*—George B. Davis
(74) *Attorney, Agent, or Firm*—Herbert L. Lerner; Laurence A. Greenberg; Werner H. Stemer

(57) ABSTRACT

A method for analyzing and displaying process states of a technical plant includes enabling simultaneous, coherent assessment and display of relevant process variables of the plant by evaluating relevant process variables with regard to one another through the use of a neural analysis on the basis of self-organizing maps, by making a topology-producing projection of data of the relevant process variables onto a neural map. The current process courses are plotted as trajectories on the map. Evaluation in the sense of a diagnosis can be carried out either visually or in an automated manner.

14 Claims, 5 Drawing Sheets

OTHER PUBLICATIONS

Patent Abstracts of Japan No. 05130737 (Kenichi), dated May 25, 1993.

Japanese Patent Abstract No. 06049515 (Koichi), dated Feb. 22, 1994.

Helge Ritter et al.: :Kohonen's Self–Organizing Maps: Exploring their Computational Capabilities, Jul. 24, 1988, Proceedings of the International Conference on Neural Networks, San Diego, Jul. 24–27, 1988, No. 1988, pp. 109–116.

Dagmar Niebur: "Power System Static Security Assessment Using The Kohonen Neural Network Classifier", Proceedings of the Power Industry Computer Application Conference, Baltimore, May 7–10, 1991, Conf. 17, pp. 270–277.

Hiroyuki Mori: "An Artificial Neural–Net Based Technique for Power System Dynamic Stability with the Kohonen Model", Proceedings of the Power Industry Computer Application Conference, Baltimore, May 7–10, 1991, Conf. 17, pp. 293–301.

G. Whittinton: "An Efficient Multiprocessor Mapping Algorithm for the Kohonen Feature Map and its Derivative Models", International Conference On Neural Networks/ World Congress On Computational Intelligence, orlando, Jun. 27–29, 1994, vol. 1, pp. 17–21.

Teuvo Kohonen: "The Self–Organizing Map", 78(1990), No. 9, new York, Proceedings of the IEEE.

* cited by examiner

METHOD FOR ANALYSIS AND DISPLAY OF TRANSIENT PROCESS EVENTS USING KOHONEN MAP

BACKGROUND OF THE INVENTION

Field of the Invention

The invention relates to a method for analysis and display of transient process events in a technical plant.

The method is suitable for analyzing and displaying process states and events in a power plant.

It is well known for individual process variables to be detected by measurement technology, observed and also evaluated as a function of a process state. However, better assessment of a technical process is possible by simultaneous, holistic observation of all relevant process variables.

SUMMARY OF THE INVENTION

It is accordingly an object of the invention to provide a method for analysis and display of transient process events, which overcomes the hereinafore-mentioned disadvantages of the heretofore-known methods of this general type and which enables simultaneous, coherent assessment and display of relevant process states and sequences of process states in a technical plant. In particular, it should become possible to analyze and display transient process events. An expansion of the method for diagnosing transient events is also to be disclosed.

With the foregoing and other objects in view there is provided, in accordance with the invention, a method for analyzing and displaying process variables, process states or sequences of process states in a technical plant, which comprises combining and evaluating all variables relevant to a process in relationship to one another by a neural analysis on a basis of Kohonen maps, by performing a topology-producing projection of data of relevant process variables on a two-dimensional Kohonen map.

In accordance with another mode of the invention, the technical plant is a power plant or part of a power plant.

In accordance with a further mode of the invention, there is provided a method which comprises additionally displaying sequences of process states detected as a reference course, to assess current sequences of process states on a previously statically visualized two-dimensional Kohonen map.

In accordance with an added mode of the invention, the detected process states are different load states.

In accordance with an additional mode of the invention, there is provided a method which comprises displaying a trajectory of process events by a graphic connection of visualized process states.

In accordance with yet another mode of the invention, there is provided a method which comprises displaying a plurality of trajectories one above the other, for permitting a comparison of process courses.

In accordance with yet a further mode of the invention, there is provided a method which comprises permitting a manual process analysis, once a user has selected map portions having the greatest deviation between two trajectories, by the following additional steps: calculating a standard deviation of a distribution of weight of selected neurons, and outputting weight indices having the greatest deviations from one another; and ascertaining process variables on which the weight indices of the neurons are based and which cause the most trajectory deviations on the map.

In accordance with yet an added mode of the invention, there is provided a method which comprises performing an automated diagnosis by the following additional steps: automatically detecting deviations between two trajectory courses on a process map with the aid of a supervisor map, by comparing trajectory portions to be examined on-line, including a predeterminable number of trajectory positions, with reference portions, and automatically performing following steps in the event of deviations by a predeterminable value; calculating standard deviations in weight distributions for neurons in which the trajectories differ by the predeterminable value, and ascertaining weight indices having the greatest deviations from one another; and ascertaining the process variables on which the weight indices of the neurons are based and which cause the most trajectory deviations on the map.

In accordance with yet an additional mode of the invention, there is provided a method which comprises: making a prognosis of process variables by the following additional steps: graphically extrapolating a trajectory course at a first time within a predeterminable time segment for ascertaining a process state to be expected at a second time, and making the extrapolation on the basis of a further course of a reference trajectory; ascertaining and outputting the process variables and process values belonging to the respective process state to be prognosticated; and furnishing the prognosticated process values for selected process variables for downstream closed-loop and open-loop control systems.

In accordance with again another mode of the invention, there is provided a method which comprises displaying a distribution of a selected process variable above the Kohonen map with height or color coding, by plotting a weight distribution corresponding to the process variable as a height or color above the map.

In accordance with a concomitant mode of the invention, there is provided a method which comprises displaying a distribution of a plurality of selected process variables above the Kohonen map, and ascertaining and displaying differences in weight between one neuron and its neighboring neurons of selected process variables in a color-coded manner.

Another principle for attaining the object would be a method based on primary component analysis, that is a mathematical method for dimensional reduction, which seeks to achieve the best possible description of a data distribution from a high-dimensional space within a low-dimensional space. In primary component analysis or variant analysis, that is achieved through the use of a linear projection in a space, which is defined by the intrinsic vectors of the data distribution. However, that linear principle involves restrictions, and primary component analysis is therefore not believed to be a satisfactory way to attain the stated object.

General feasibility of the method is assured even for the most difficult data distributions by using nonlinear, neural methods in accordance with the invention and the method is not subject to any linear restrictions.

Through the use of the holistic principle, not only the values of the individual process variables but also precisely their mutual effects on one another are taken into account.

In terms of the method, a projection onto nonlinear surfaces, so-called primary multiplicities, is performed. These nonlinear surfaces are defined by so-called topology-producing Kohonen maps in the state space of the plant.

In neural theory, such a map is understood to be a "self-organizing neural network", in which all of the neurons are disposed side by side. The term self-organizing neural network is a coined term for a special class of neural networks, which structure themselves on the basis of input signals, as is seen in the publication by A. Zell, entitled "Simulation Neuronaler Netze" [Simulation of Neural Networks], Addison-Wesley Verlag, 1994, pp. 179–187. Unlike conventional neural networks, in Kohonen maps the spatial location of the individual neurons plays an important role.

The process state calculated by the method is plotted on this topology-producing map of potential process states and visualized and is also comparable directly with other process states, such as previous process states. Therefore, in principle the map is a topology-producing, two-dimensional window into the n-dimensional state space of the plant. In the context of this description, "topology-producing" means that the points which are located close together in the input space are also located close together in the output space, or in other words on the map.

In the method of the invention, after suitable data processing, the relevant n process variables are offered to a self-organizing network in a learning phase. The learning phase proceeds in two stages: First, the map forms in the state space of the plant, and afterward, the plant states are visualized by employing a mathematical method.

The formation of the self-organizing map in the state space of the plant is realized by the neural algorithm of T. Kohonen. The self-organizing neural algorithm was introduced by Kohonen in 1982, as is seen from a publication by T. Kohonen, entitled "Self-Organized Formation Of Topologically Correct Feature Maps" in Biological Cybernetics, 43, 59–69, 1982, which is why these maps are also known as Kohonen maps.

The visualization of the physical plant states is performed by a static visualization method, in which the differences in the weight vectors of each neuron and its neighbors are calculated and processed graphically, and accordingly they may be displayed with color coding, for instance. Coherent regions (such as light-colored surfaces in FIG. 2) have a small difference, since their neurons in the state space have been placed close together. Boundaries between these individual clusters are characterized by a high difference among the various weight vectors and these are visualized, for instance, as dark surfaces (see FIG. 2). Thus good visualization of the cluster boundaries and therefore of the actual plant states can be achieved, as is also seen in a publication by G. Whittington and C. Spracklen, entitled: The Application of Neural Network Model to Sensor Data Fusion, in Proceedings of Applications of ANN Conference, Orlando, USA, 1990.

A topology-producing projection of all relevant plant states is realized with this visualization. In other words, various plant states in reality are also shown spatially separated from one another on the map. Various data clusters are visually processed for the process observer by the choice of color codings on this neural map.

In the application phase of the map, statements about the current and future process state can be made by constructing and developing a trajectory of process states on this map, through the use of a "winner take all" algorithm. The winner take all algorithm is a method in which only the neuron that best meets a certain condition is ever active, while all of the other neurons of the network or map are inactive (one out of m choice). This special condition is, for instance, a minimum spacing between the current input vector and the weight vector of the individual neurons. Reference is therefore made in this regard to a publication by S. Hafner, entitled "Neuronale Netze in der Automatisierungstechnik" [Neural Networks in Automation], Oldenbourg Verlag, 1994, especially pp. 17–25.

Analyzing the individual process variable distributions on the map makes it possible to detect new process relationships and problems. Back-transformation of the abstract representation of the map onto the individual process variables makes it possible to ascertain causes of process deviations. The method can thus be employed for on-line process control, early error detection, and diagnosis.

The method is automated by constructing and developing a hierarchical Kohonen map, in the sense that the method can detect deviations in process events, shown as trajectories on a map, automatically from a reference event and can determine the fundamental causes.

Other features which are considered as characteristic for the invention are set forth in the appended claims.

Although the invention is illustrated and described herein as embodied in a method for analysis and display of transient process events, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
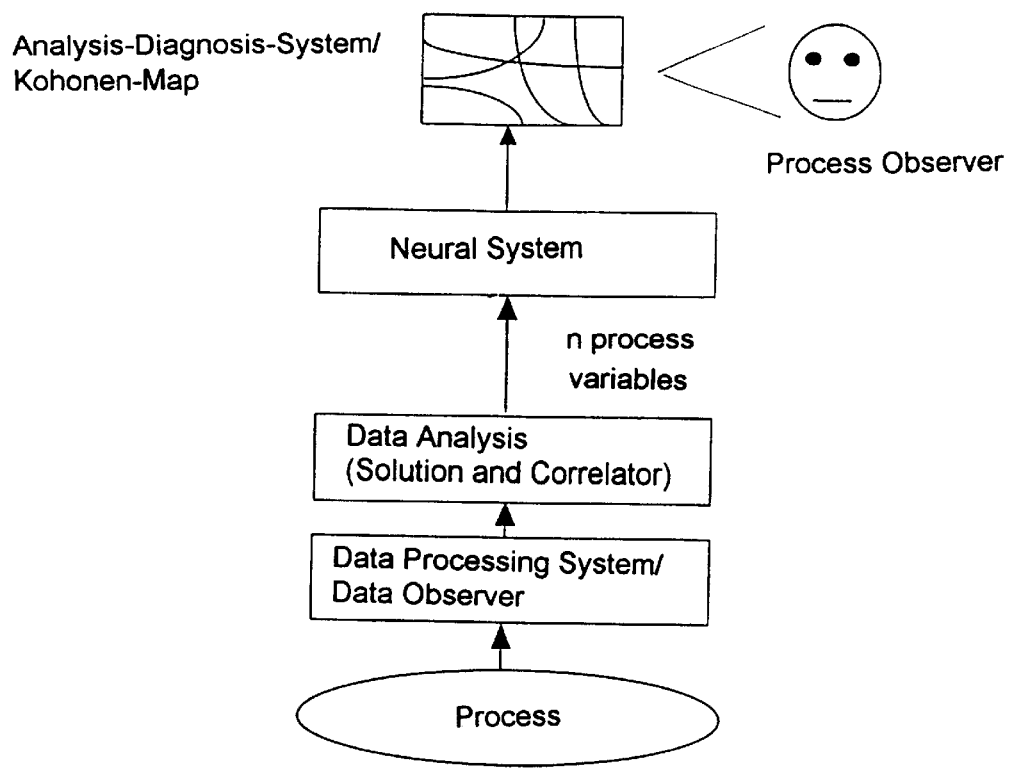
FIG. 1 is a structural diagram showing essential components of a system for performing the method.

A description of the method is broken down below into various method steps and will be explained in conjunction with exemplary projections in the drawing figures.

Referring now to the figures of the drawings in detail and first, particularly, to FIG. 1 thereof, there is seen a structure of a system for performing the method for process analysis and diagnosis with a neural map. A description of the structure will become apparent from the description of the method steps.

Method Step 1: Acquisition and Selection of the Process Variables

Acquisition and processing of the data. A data detection and processing system, such as a data server based on a computer in a control system, cyclically detects process values from a technical plant, for instance for a boiler of a power plant. A following data analysis system subjects the selected, relevant data to a correlation analysis, in order to determine independent measurement variables that describe the process.

Method Step 2: Learning Phase of the Map (Off-line)

Step 2.1. Formation of the self-organizing neural network in the state space of the plant, based on T. Kohonen's algorithm.

In principle, through the use of the Kohonen algorithm, the weight vectors of the neurons on the map are adapted, taking into account both their relationships with neighbors and the input vector.

The physical process values of the aforementioned process variables are used as the input variables for the network.

Step 2.2. Displaying the formed network in the form of a map by using a static visualization method, in which the differences among the weight vectors of the neurons are visualized.

Figure 2:
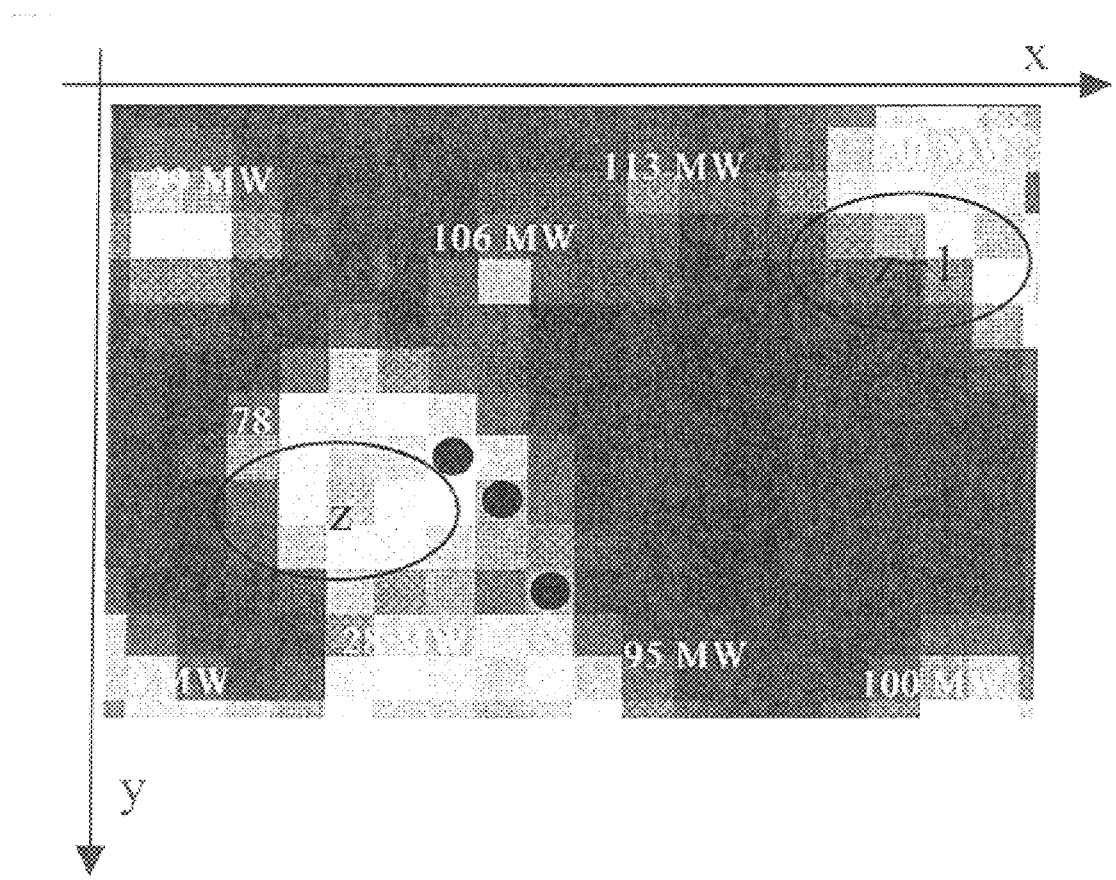
FIG. 2 is a neural map for nine different load states of a boiler.

FIG. 2, by way of example, in this case in a black and white illustration, shows the structured and color-coded neural map for various plant states of a boiler (light-colored coherent areas). This represents the projection and visualization of a plurality of load states on a boiler on a neural map having 15*20 neurons. The current load of the power plant in megawatts is plotted in the image by hand for the various clusters. In FIG. 2, the X axis indicates the direction of the neurons in the X direction, and the Y axis the number of neurons in the Y direction. The plant states Z and Z+1 represent two different load states of the plant.

The dark areas on the map form the boundaries between the various plant states, since they represent neurons that are very far away from one another in the plant space. The light-colored clusters in the map form neurons that are very close together in the plant space and correspond to the real load states of the plant.

Although in this example each plant state is determined by eleven independent process variables and is thus eleven-dimensional, a projection to only two dimensions can be carried out through the use of the method. This provides considerably better clarity as to the actual process states than if all eleven process variables are observed individually. The number of process variables which are evaluated simultaneously is not limited to eleven and may be substantially higher.

With this method, a topology-producing projection of all of the relevant plant states is thus realized. For instance, what are in actuality different load states are also shown spatially separately on the map.

Method Step 3: Application—Process Analysis with the Map (Off-line/On-line)

Step 3.1. Linking the map to the process and showing the current process state on the structured map.

In the application phase, that is during power plant operation, the current process state is evaluated through the use of a neural winner take all algorithm and plotted on the previously structured, color-coded map. In FIG. 2, the three black circles represent three different plant states at different times t. Thus the current, in general high-dimensional plant state can be visualized in the context of other plant states. The spatial location of the current process state on the structured map provides information about the current state of the plant.

Step 3.2. Graphic linking of winner neurons

In the application phase, whichever is currently the winner neuron at a time $t_o$ is marked, for instance with a black circle (see FIG. 2). If these winner neurons are linked together, then a trajectory of the current process states forms on the structured map over a time t. This trajectory either grows continuously, or wanders around on the map at a fixed, predetermined length.

Figure 3:
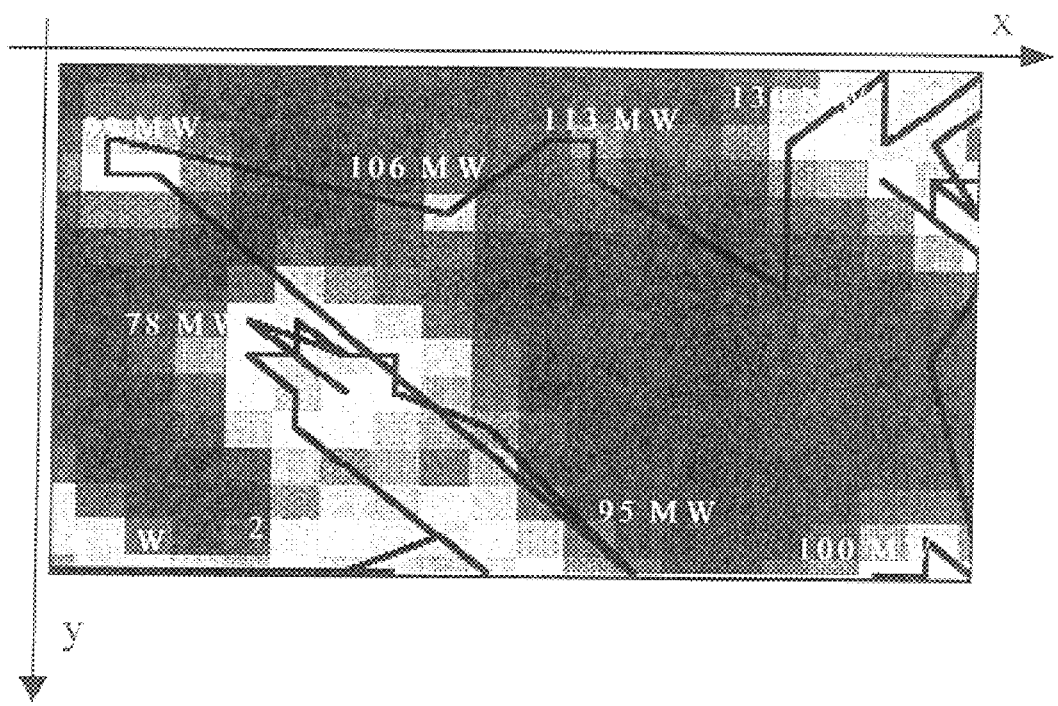
FIGS. 3 and 4 show a trajectory course upon startup and load change of a boiler for two different events.

FIG. 3, which in this case is a black and white view, by way of example shows such a trajectory course on a structured, color-coded neural map with 15*20 neurons upon startup and load change of a boiler, over a period of 250 minutes. The X axis in FIG. 3 shows the number of neurons in the X direction and the Y axis the number of neurons in the Y direction. The various load states of the plant are marked by light-colored clusters in the picture.

Step 3.3. Placing trajectories of various process events one above the other, for visual comparison and analysis of complex dynamic events.

Since a plurality of trajectories can be superimposed on one map, an arbitrary process event $t_u$ can be visually as compared with a previous reference event $t_r$. Thus not only individual process states but also complex process events can be compared with one another and deviations are detected very quickly. Holistic, visual error detection is thus made possible even for dynamic power plant events.

Figure 4:
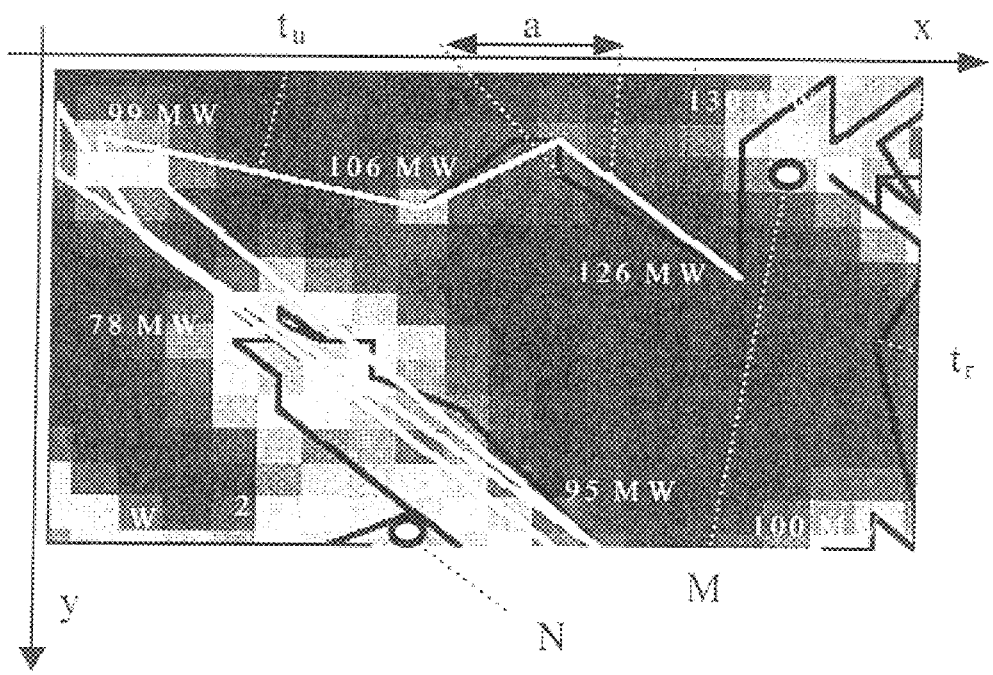

FIG. 4 shows an example for two different boiler runs. A black trajectory $t_r$ corresponds to a "good" reference run and a white trajectory $t_u$ in this case represents a load change from 126 MW to 95 MW. The X axis in FIG. 4 indicates the number of neurons in the X direction and the Y axis the number of neurons in the Y direction. The potential load states of the plant are marked by light-colored clusters in the drawing.

Method Step 4: Application—Diagnosis Phase of the Map

In order to determine the cause of deviations between the course of trajectories, the weight distribution of the individual neurons can be analyzed, since the real values of the process variables are encoded in the weights. In order to make this clear, by way of example the different weight distributions of two neurons will be discussed: neuron "N" is placed virtually in the plant space at the state 28 MW, and neuron "M" responds to the load state 130 MW, with its spatial location on the map being marked as a white circular area in FIG. 4.

Figure 5:
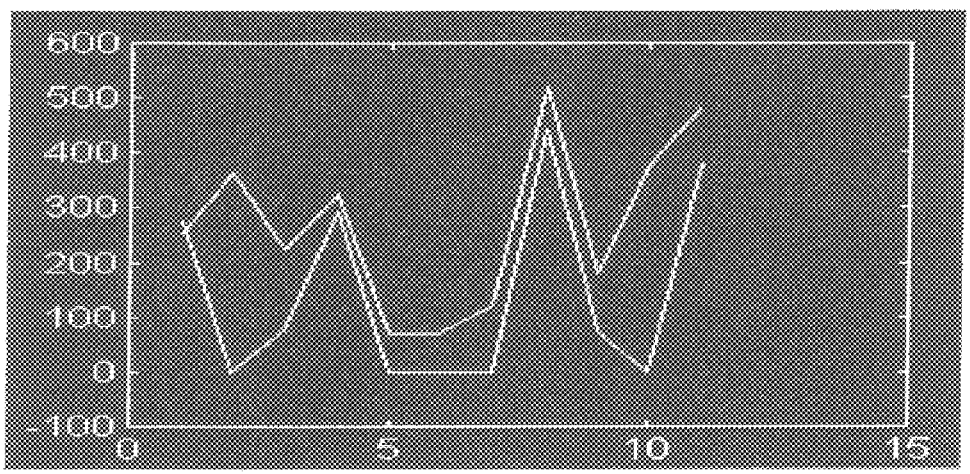
FIG. 5 shows a different weight distribution of two neurons on the formed map.

FIG. 5 shows a weight distribution of these two map neurons. The X axis in FIG. 5 corresponds to the weights $w_1$, $w_2, \ldots, w_{11}$ of the neurons "N" and "M", and the Y axis represents the standardized values for the individual weights. It can be seen that the neurons differ from one another primarily in their weights $w_{10}$, $w_2$ and $w_3$. This is confirmed by calculating a standard deviation.

These calculated subscripts, which are 10, 2 and 3 in the example, can then be projected unambiguously onto the various process values, since there is an unambiguous association between the weights and the individual process variables, because of the learning process. In the example, the differences reside in the process variables: fresh steam amount at the boiler outlet, feedwater amount at the boiler inlet, feedwater pressure at the boiler inlet.

Process analysis is made possible by calculating the correlation coefficient and the standard deviation of the weight distribution of selected (operator-selected) neurons. The operator can thus ascertain the cause of two arbitrary deviations on line, because all he or she has to do is click on the neurons on the map where the trajectories particularly markedly (visually) differ from one another, for instance through the use of a spacing a in FIG. 4. The cause of the deviations, or in other words the process variables having the greatest standard deviations, is calculated subsequently. Thus simple possibilities for diagnosis can be achieved with the map.

Method Step 5: Showing Process Relationships with the Map

Figure 6:
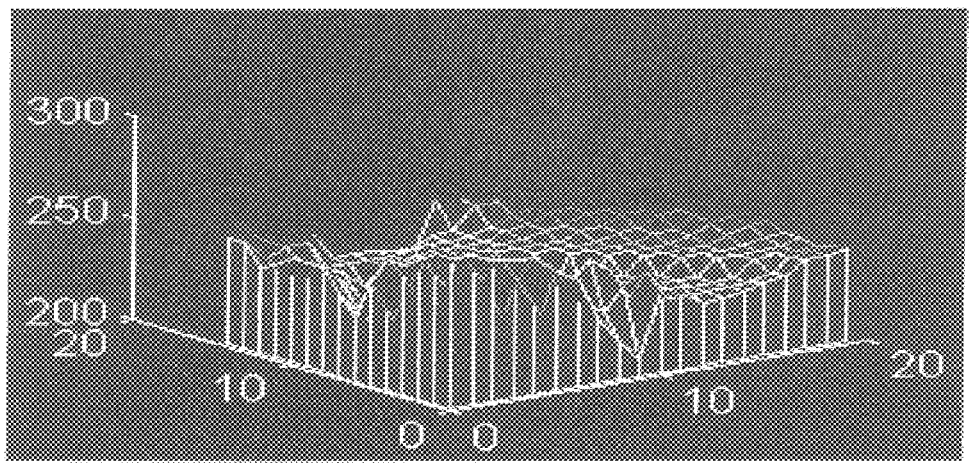
FIGS. 6 and 7 show a process variable distribution of two selected process variables above the map.
Figure 7:
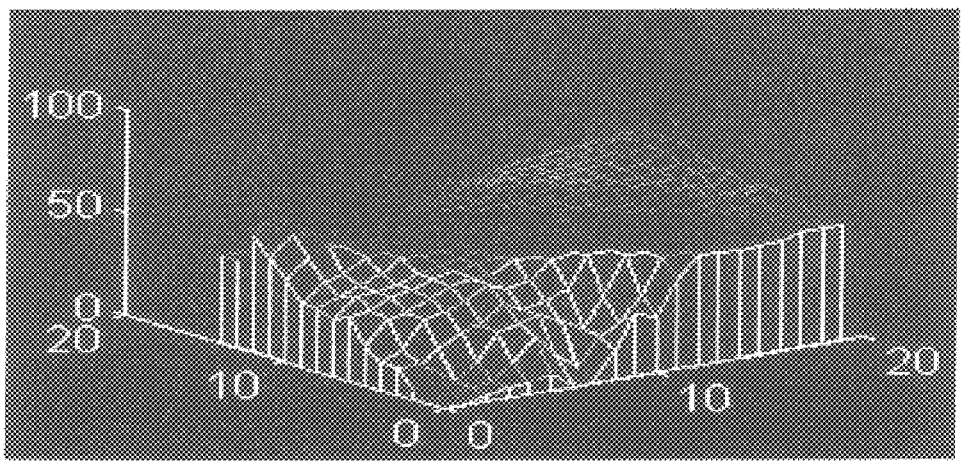

Step 5.1. One further possible processing step on the map leads to the use of data mining strategies in the power plant field, in which the weight distributions of individual process variables are shown above the entire map. FIGS. 6 and 7 clearly show this for one example. Since the process distribution is encoded in the weights of the neurons on the map, and the weight distribution can be shown above the map, an unequivocal statement is thus obtained about the distribution of the real process variables above the map and therefore a distribution in the state space of the plant.

The graphic conversion of these weight distributions to a three-dimensional illustration is carried out in such a form that in each case the magnitude of the weight $w_k$ of each neuron in the Z axis above the map is plotted and visualized in the X-Y axes. FIG. 6 shows the distribution of the feedwater temperature (Z axis) above the map (X, Y axes) and FIG. 7 shows the distribution of the rpm of the coal metering hoppers (Z axis) above the map (X, Y axes).

Upon comparison of these distributions with the (real) plant states shown on the map (clusters), new kinds of hypotheses can be obtained about the various plant states.

Step 5.2. The application of the method for static visualization of weight differences (see the previous section) for selected process variables, permits relationships between these variables and existing process states to be visualized. These are relationships that would not be recognizable if the complete weight distributions were to be evaluated.

The possibilities of process analysis can be expanded decisively with the method steps described above, because it is now possible not only to verify novel process relationships but also to generate new, previously unknown knowledge.

Step 5.3. The use of a graphic extrapolation of the trajectory course $t_u$ at a predeterminable time $t_0$ at a predeterminable time segment $\Delta t$ along the reference course $t_r$ onto an expected process state at a second time $t_0+\Delta t$, permits future process values to be estimated, by ascertaining and outputting the process values pertaining to the expected process state.

Method Step 6: Automatic Detection of Process Deviations

Figure 8:
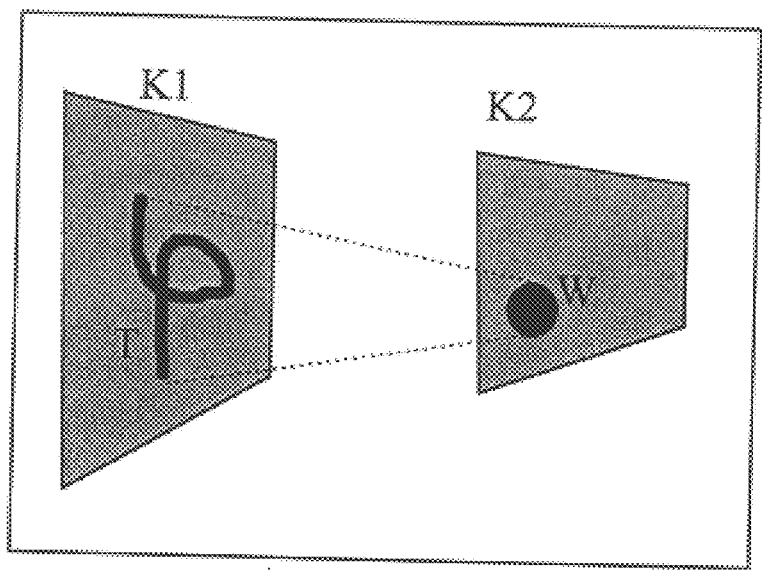
FIG. 8 shows a schematic layout of an automatic error detection system with hierarchical Kohonen maps.

Until now, the deviation between two trajectories was ascertained visually. In other words, the operator must observe the map during the process events to be studied. In order to automate this process, hierarchical maps are used. A downstream supervisor map "observes" the trajectories on the previous process map and evaluates them. FIG. 8 shows this schematically, with the process map being marked K1 and the supervisor map being marked K2. Reference symbol T represents an arbitrary trajectory on the process map, and reference symbol W represents an associated winner neuron on the supervisor map.

Discrete trajectory positions $t_1, t_2, \ldots, t_m$ to be learned on the process map K1 are encoded in data vectors of a dimension m, and the supervisor map K2 is made available as input data. This supervisor map again functions by Kohonen's algorithm.

In other words, the learning of the topological relationships of the trajectories on the process map is carried out by applying this algorithm to the supervisor map. The supervisor map thus learns the trajectory courses on the process map, and the following functionalities can be realized:

Process map: Showing the current and past process course as a trajectory.

Supervisor map: Coding and showing the topology and location of relevant trajectory portions of the process map. The trajectory courses of the process map are encoded on the supervisor map by one "supervisor" neuron each, which is active precisely whenever the respective trajectory portion is shown on the process map.

The supervisor map thus achieves a further dimensional reduction, and specifically, as described, a partial procedure of the process is shown on the process map as a trajectory course with m discrete trajectory positions, but on the supervisor map this trajectory course is shown for a single neuron and thus is combined into a single point. Neuron clusters are thus formed on the supervisor map that correspond to similar trajectory portions on the process map by applying the learning process according to Kohonen.

In the application phase of the supervisor map, the trajectory portion to be studied on the process map, which again must include m discrete trajectory positions, is analyzed by the supervisor map and compared for similarity to previously learned trajectory portions. The similarity is exhibited in the spacing of the current winner neuron from the "supervisor" neuron for the various previously learned trajectory portions. This spacing is thus a measure for the similarity between two trajectory courses or portions of trajectory courses.

If the spacing is greater than a settable threshold value, then the diagnostic system automatically recognizes that the current trajectory course, which may, for instance, represent a current load change, deviates from a previously learned reference course.

The system will thus generate an error report, and the cause of the trajectory deviation is automatically ascertained on the basis of method step 4, since for the various trajectory deviations the causes are calculated through the use of automatic analysis of the weight distributions of fundamental neurons.

Complete Method

A process observer and operator is given the capability of intuitively detecting highly complex dynamic processes and observing the effects of his or her process interventions directly by applying this method. Since the method is real-time-capable in the application phase, this process analysis and diagnosis can be utilized to support on-line process control.

The advantage of the method described herein is that not only can one compare different process states with one another, but even complex, transient process events, such as complete startup runs or shutdown runs, can be plotted and automatically compared with one another, which represents a powerful expansion of current analysis systems in the power plant field. The method represents an automated diagnostic system for transient power plant events.

A further advantage of the invention is the relatively effortless engineering. Since the learning and structuring of the maps as well as the plotting of the trajectories are carried out in an automated manner and are produced in complete form by the method, complicated and expensive engineering of reference models can be omitted. This engineering is an integral component of the method itself.

We claim:

1. A method for analyzing and displaying process variables, process states or sequences of process states in a technical plant by performing a topology-producing projection of data of relevant process variables on a two-dimensional Kohonen map, which comprises:

initially displaying a sequence of process states as a reference trajectory by graphically interconnecting neurons representing respective process states resulting in displayed process states;

forming at least one further trajectory by graphically connecting the displayed process states;

displaying the at least one further trajectory for assessing current sequences of process states;

displaying a plurality of trajectories one above the other, for permitting a comparison of process courses; and permitting a manual process analysis, once a user has selected map portions having the greatest deviation between two trajectories, by performing the following additional steps:
   a) calculating a standard deviation of a distribution of weight of selected neurons, and outputting weight indices having the greatest deviations from one another; and
   b) ascertaining process variables on which the weight indices of the neurons are based and which cause the most trajectory deviations on the map.

2. The method according to claim 1, wherein the technical plant is at least part of a power plant.

3. The method according to claim 1, wherein the detected process states are different load states.

4. The method according to claim 1, which further comprises:
performing an automated diagnosis by performing the following additional steps:
   a) automatically detecting deviations between two trajectory courses on a process map with the aid of a supervisor map, by comparing trajectory portions to be examined on-line, including a predeterminable number of trajectory positions, with reference portions, and automatically performing the following steps in the event of deviations by a predeterminable value;
   b) calculating standard deviations in weight distributions for neurons in which the trajectories differ by the predeterminable value, and ascertaining weight indices having the greatest deviations from one another; and
   c) ascertaining the process variables on which the weight indices of the neurons are based and which cause the most trajectory deviations on the map.

5. The method according to claim 1, which further comprises:
making a prognosis of process variables by performing the following additional steps:
   a) graphically extrapolating a trajectory course at a first time within a predeterminable time segment for ascertaining a process state to be expected at a second time, and making the extrapolation on the basis of a further course of a reference trajectory;
   b) ascertaining and outputting the process variables and process values belonging to the respective process state to be prognosticated; and
   c) furnishing the prognosticated process values for selected process variables for downstream closed-loop and open-loop control systems.

6. The method according to claim 1, which further comprises displaying a distribution of a selected process variable above the Kohonen map with height or color coding, by plotting a weight distribution corresponding to the process variable as a height or color above the map.

7. The method according to claim 1, which further comprises displaying a distribution of a plurality of selected process variables above the Kohonen map, and ascertaining and displaying differences in weight between one neuron and its neighboring neurons of selected process variables in a color-coded manner.

8. A method for analyzing and displaying process variables, process states or sequences of process states in a technical plant by performing a topology-producing projection of data of relevant process variables on a two-dimensional Kohonen map, which comprises:
initially displaying a sequence of process states as a reference trajectory by graphically interconnecting neurons representing respective process states resulting in displayed process states;
forming at least one further trajectory by graphically connecting the displayed process states;
displaying the at least one further trajectory for assessing current sequences of process states;
displaying a plurality of trajectories one above the other, for permitting a comparison of process courses; and
performing an automated diagnosis by performing the following additional steps:
   a) automatically detecting deviations between two trajectory courses on a process map with the aid of a supervisor map, by comparing trajectory portions to be examined on-line, including a predeterminable number of trajectory positions, with reference portions, and automatically performing the following steps in the event of deviations by a predeterminable value;
   b) calculating standard deviations in weight distributions for neurons in which the trajectories differ by the predeterminable value, and ascertaining weight indices having the greatest deviations from one another; and
   c) ascertaining the process variables on which the weight indices of the neurons are based and which cause the most trajectory deviations on the map.

9. The method according to claim 8, wherein the technical plant is at least part of a power plant.

10. The method according to claim 8, wherein the detected process states are different load states.

11. The method according to claim 8, which further comprises:
permitting a manual process analysis, once a user has selected map portions having the greatest deviation between two trajectories, by performing the following additional steps:
   a) calculating a standard deviation of a distribution of weight of selected neurons, and outputting weight indices having the greatest deviations from one another; and
   b) ascertaining process variables on which the weight indices of the neurons are based and which cause the most trajectory deviations on the map.

12. The method according to claim 8, which further comprises:
making a prognosis of process variables by performing the following additional steps:
   a) graphically extrapolating a trajectory course at a first time within a predeterminable time segment for ascertaining a process state to be expected at a second time, and making the extrapolation on the basis of a further course of a reference trajectory;
   b) ascertaining and outputting the process variables and process values belonging to the respective process state to be prognosticated; and
   c) furnishing the prognosticated process values for selected process variables for downstream closed-loop and open-loop control systems.

13. The method according to claim 8, which further comprises displaying a distribution of a selected process variable above the Kohonen map with height or color coding, by plotting a weight distribution corresponding to the process variable as a height or color above the map.

14. The method according to claim 8, which further comprises displaying a distribution of a plurality of selected process variables above the Kohonen map, and ascertaining and displaying differences in weight between one neuron and its neighboring neurons of selected process variables in a color-coded manner.

* * * * *

UNITED STATES PATENT AND TRADEMARK OFFICE
CERTIFICATE OF CORRECTION

PATENT NO. : 6,321,216 B1  
DATED : November 20, 2001  
INVENTOR(S) : Ralf Otte et al.

Page 1 of 1

It is certified that error appears in the above-identified patent and that said Letters Patent is hereby corrected as shown below:

<u>Title page,</u>
Item [54] should read as follows:

-- METHOD FOR ANALYSIS AND DISPLAY OF TRANSIENT PROCESS EVENTS --

Signed and Sealed this

Twenty-sixth Day of March, 2002

Attest:

Attesting Officer

JAMES E. ROGAN
*Director of the United States Patent and Trademark Office*